(12) United States Patent
Gauthier et al.

(10) Patent No.: US 6,487,568 B1
(45) Date of Patent: *Nov. 26, 2002

(54) METHOD AND SYSTEM FOR FLOWING DATA TO AN ARBITRARY PATH DEFINED BY A PAGE DESCRIPTION LANGUAGE

(75) Inventors: Forrest P. Gauthier, Maineville, OH (US); James R. Walker, Maineville, OH (US)

(73) Assignee: Tesseron, Ltd., Loveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/818,665

(22) Filed: Mar. 27, 2001

Related U.S. Application Data

(63) Continuation-in-part of application No. 08/897,467, filed on Jul. 18, 1997, now Pat. No. 6,209,010.

(51) Int. Cl.⁷ .............................. G06F 17/00; G06K 9/48
(52) U.S. Cl. ...................... 707/526; 345/620; 382/199
(58) Field of Search ................................ 707/500, 526, 707/507–525, 1; 382/199, 232, 181; 345/418, 467–470, 204, 965; 358/1.1, 400, 448, 488

(56) References Cited

U.S. PATENT DOCUMENTS

| | | | |
|---|---|---|---|
| 5,103,490 A | * 4/1992 | McMillin | 235/440 |
| 5,134,669 A | 7/1992 | Keogh et al. | 382/61 |
| 5,157,765 A | 10/1992 | Birk et al. | |
| 5,202,206 A | 4/1993 | Tam | |
| 5,208,906 A | 5/1993 | Morgan | |
| 5,231,698 A | 7/1993 | Forcier | |
| 5,291,243 A | 3/1994 | Heckman et al. | 355/201 |
| 5,459,819 A | * 10/1995 | Watkins et al. | 345/634 |
| 5,459,826 A | * 10/1995 | Archibald | 345/634 |
| 5,467,448 A | 11/1995 | Hilton et al. | |
| 5,506,697 A | * 4/1996 | Li et al. | 235/462.09 |
| 5,539,529 A | * 7/1996 | Merchant | 340/7.56 |
| 5,542,052 A | * 7/1996 | Deutsch et al. | 345/589 |
| 5,600,768 A | * 2/1997 | Anderson | 345/629 |
| 5,611,024 A | 3/1997 | Campbell et al. | |
| 5,671,345 A | 9/1997 | Lhotak | |
| 5,754,750 A | * 5/1998 | Butterfield et al. | 345/418 |
| 5,841,420 A | 11/1998 | Kaply et al. | |
| 5,926,185 A | 7/1999 | Vyncke et al. | |

OTHER PUBLICATIONS

IDG Info World, Oct. 9, 1995, Review, p. 91.
IDS Info World, Mar. 20, 1995, Product Reviews; Desktop publishing software; p. 92.
Info World, May 9, 1994, Reviews; p. 98.

* cited by examiner

Primary Examiner—Alford W. Kindred
(74) Attorney, Agent, or Firm—Taft, Stettinius & Hollister LLP

(57) ABSTRACT

A method for flowing data, such as text data, into an arbitrary path defined by a page description language specification ("PDL specification") generally comprises the steps of: identifying a path defined in the PDL specification as a datawrapping path; associating a data block with the datawrapping path; and generating a bitmap representation of the data block according to the path boundary and according to a predefined flow rule. Preferably, the identifying step includes the steps of associating a graphics state with the path and storing the graphics state in memory, and the generating step includes the step of applying the stored graphics state to the data block. Therefore, the generating step can be repeated for multiple data blocks to generate multiple bit map representations. The text wrapping path is preferably identified in the PDL specification by an attribute string associated with the path. Therefore, when the wrapping path is identified, the graphic states of the attribute string are saved in memory and are then subsequently applied to the data blocks when the bitmap representations of the data blocks are generated.

1 Claim, 8 Drawing Sheets

METHOD AND SYSTEM FOR FLOWING DATA TO AN ARBITRARY PATH DEFINED BY A PAGE DESCRIPTION LANGUAGE

CROSS REFERENCE TO RELATED APPLICATION

This application is a continuation-in-part of U.S. Ser. No. 08/897,467 filed Jul. 18, 1997, now U.S. Pat. No. 6,209,010 currently pending.

BACKGROUND

The present invention relates to the high speed printing industry, and more particularly a system and method for flowing variable data into a page description language file in a high speed printing environment.

Application programs, such as word processors, illustrators, and computer-aided design systems are software packages used to create a document (text and graphics) on a computer screen and to simultaneously generate a page description language ("PDL") specification, which is to be transferred to the printer or to any other type of raster or output device for creating a hard copy or copies of the document. Alternatively, a PDL specification can be generated by a programmer without the assistance of an application program.

The printer executes the PDL specification to generate a bitmap of the document, or a raster-data representation of a document, and eventually transfers the bitmap or raster-data to the physical medium. A typical PDL language, such as PostScript (a registered trademark of Adobe Corporation) defines a page of the document as containing a number of data areas, where each data area contains either graphic or alpha-numeric data. Each data area is defined by a "graphic state," which is a collection of parameters for controlling the representation and appearance of text and graphics. For example, the graphic state can include a set of text attributes such as scale-factor, type-font, etc. In PostScript, an example of a PDL command used to build a graphic state can be: "twenty rotate," and "/Times-Roman find font 14 scalefont setfont." Examples of PDL commands used to define the graphic or alpha-numeric data that is displayed in the data area include: 00 moveto and (ABC) show. The entire group of PDL commands used to define a document is hereinafter referred to as the "PDL specification."

In variable data printing each printed document shares a common template and there is at least one area in the template that changes for each printing of the template. Typical PDL languages are not designed for high-speed variable data printing because, with PDL languages and PDL interpreters, even if a single item of data in the document changes, an entirely new PDL specification must be created and interpreted. For example, if one-hundred thousand copies of a mass-mailing advertisement were to printed (i.e., each copy of which is identical except for the mailing address), it is typically necessary to generate a new PDL specification for each copy to printed. Hence, to generate one-hundred thousand advertisements, it would be necessary to generate one-hundred thousand PDL specifications, even though each advertisement is virtually the same except for the variable data area. The processing time required to interpret and render one-hundred thousand PDL specifications is enormous, significantly slowing the entire printing system.

Furthermore, typical PDL languages do not include any text or data flowing capabilities. These features are usually implemented by the application program, and when such an application program flows data (such as text) into a PDL document, the calculations to determine where to place the data are completed prior to the generation to the PDL specification. Accordingly, variable data cannot be flowed into a template document without creating a new PDL specification for each document. Accordingly, there is a need for a high-speed printing operation having the ability to merge variable data into a template defined by a PDL specification; and in particular, having the ability to flow variable data into a template path defined by PDL specification in a high-speed printing operation.

SUMMARY

It is an object of the present invention to provide a system and method for flowing variable data (such as text data, image data, bar code data and the like) into a path of a template defined by a PDL specification in a high-speed printing operation. It is a further object of the present invention to provide the ability to generate a plurality of merged bitmaps, which are each essentially a copy of a template, except for at least one portion of the template that contains an arbitrary path. In that path, each merged bitmap can contain a different set of variable data merged into it. The template is defined by a page description language, and the page description language only needs to be processed or interpreted once before creating all of the merged bitmaps, thus providing an extremely high-speed variable data printing operation.

The computer implemented method for flowing data into an arbitrary path defined by a page description language specification ("PDL specification") generally comprises the steps of: processing (interpreting) the PDL specification to produce a template; designating a path defined in the PDL specification as a wrapping path; associating a block of variable data with the wrapping path; and merging variable data, according to the path boundary and according to a predefined flow rule, into a copy of the template.

The method of the present invention is accomplished by executing a control task in conjunction with a PDL interpreter program. The control task generates a template display list based upon the PIDL commands in the PDL specification. The display list includes a plurality of rendering commands, where each rendering command designates a particular data area or object to be rendered, the graphics state to be applied to the data area and the offset address at which the rendered object, if any, in the data area is to be overwritten onto the final bit map. The graphic states for each data area are set forth in the PDL specification, and pertain to the print attributes that describe how particular graphic or alpha-numeric data is to appear on the printed page. These attributes can include the size, font, position, orientation, location, and the like.

The control task, during the PDL interpretation procedure, monitors the data areas defined by the PDL specification to watch for variable data paths defined by the PDL code. If the control task identifies a path as being a variable data path, it reserves the graphic-states associated with that variable data path in a cache or memory, and then moves on to the next data area defined in the PDL specification, preferably without allowing the path data to be added to the template display list.

Once the interpreter program completes its interpretation of the PDL specification, the control task saves the template display list in memory without dispatching a bitmap of the template to the printer. Subsequently, a merge task is initiated which accesses a variable data record from a merge file;

associates the variable data record to a particular variable data path; creates representations of the variable data, such as rendering commands according to the reserved graphic states pertaining to that particular variable data path, according to the boundary of the particular variable data path and according to a predefined flow rule; and then generates a merged bitmap by processing the template display list and the variable data rendering commands. The final merged bitmap that may then be dispatched to the printer. This merge task is repeated for each variable data record in the merge file associated with that particular variable data path to create a plurality of the merged bitmaps.

Thus, the PDL specification of the template need only be interpreted once, saving significant processing time for the variable printing operation, because the reserved graphic states may be utilized over and over again to create the flowed data bitmap for each variable data record contained in the merge file.

How the control task identifies a particular PDL path defined in the PDL specification as being unique, i.e., as being identified as a wrapping path, is an important step in the above process. This is accomplished by providing a text command in the PDL specification that defines one or more characters that are recognized by the control task as being special characters, as opposed to merely being characters that are to be included on the printed page. The control task monitors all text strings defined by the PDL specification for such special characters, and responsive to a detection of the special character in the text string defined by the text command, the control task identifies the path command that has a predetermined relationship with the text command in the PDL specification. This predetermined relationship can be satisfied by the first path command to follow the text command in the PDL specification or by the path command that is "grouped" with the text command in the PDL specification.

In the preferred embodiment of the present invention, the characters "<<" and ">>" are used as part of a special text string to define an area as a variable data area. And if that special text string also includes the string wrap then the control task will recognize that the very next path command appearing in the PDL specification will be a unique path, in this case a path for flowing variable text bitmaps into.

DETAILED DESCRIPTION

Figure 1:
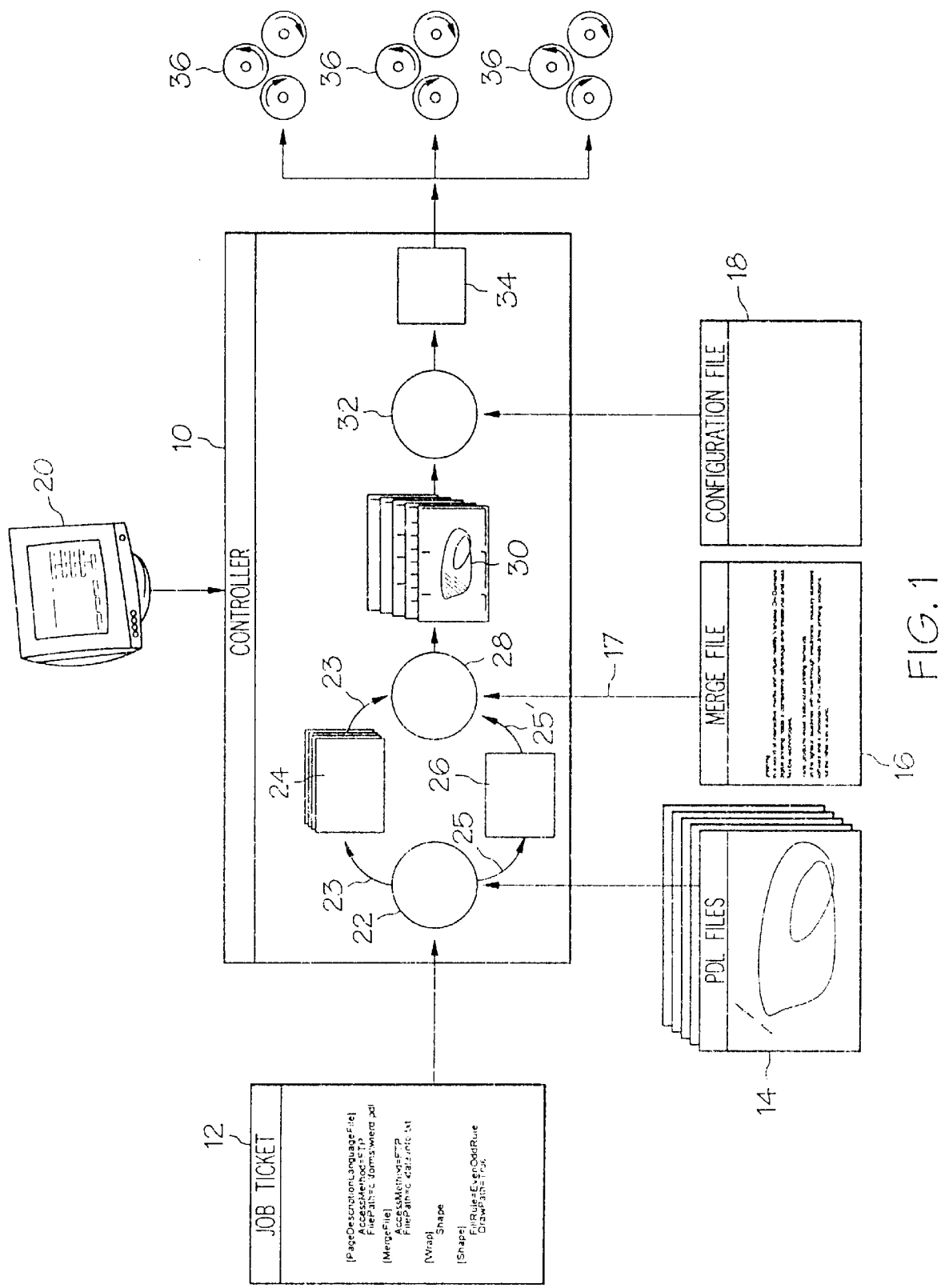
FIG. 1 is a is a schematic, block-diagram representation of a high-speed printing system according to the present invention.

As shown in FIG. 1, a system for performing the method of the present invention includes a printer controller 10 having access to a job ticket file 12, a page description language ("PDU") file 14, a source of variable data such as a merge file 16, and an optional printer configuration file 18. The system also contains an operator control terminal 20 for providing operator controls such as indicating the name and location (file-path) of the job ticket file 12 for the specific print job.

The job ticket file 12 contains the guidelines for the print job which can include the names and locations of the PDL file(s) 14, the merge file(s) 16, the configuration file(s) 18, etc.; and may also include special instructions pertaining to features such as data wrapping, described below. The PDL file 14 is preferably a PostScript specification created by an application program, such as a word processor, illustrator, or computer-aided design system. The merge file 16 contains platform independent data, such as text data, image data, bar-code data and the like, which is to be merged into a template bitmap defined by the PDL file during the merging task, as will be described in detail below. The configuration file 18 defines the print engines and post processing equipment and other options to be executed.

Initially, the location and name of the job ticket file 12 is specified by the operator using the operator control terminal 20. The printer controller 10 retrieves the job ticket file. 12 and then retrieves the PDL files 14 and merge files 16 that are specified in the job ticket file. Next the controller 10 initiates a control task 22 in conjunction with a page description code interpreter program.

The control task interprets the PDL specification from the PDL file 14 and monitors data areas defined in the PDL specification to watch for areas to become variable data areas defined by the specification. If the control task identifies a data area as being a variable data area, it reserves the graphic states 23 of that variable data area in memory 24 and then moves on to the next data area defined by the PDL specification, usually without allowing any data defined by the variable data area to be added to the template bitmap. Preferably, the control task 22 will also create a font cache (an entire set of character bitmaps generated according to the reserved graphic states) for the reserved graphic states, which will be linked to the reserved graphic states in memory 24. Once the control task completes its processing of the PDL specification, the control task saves the template bitmap in memory 26.

The control task 22 may also create a template display list 25 of static data defined by the PDL file 14. The display list 25 will include a plurality of rendering commands, where each rendering command designates a particular static data area or object to be rendered, the graphics state to be applied to the static data area and the offset address at which the rendered object, if any, in the static data area is to be overwritten onto the final bit map. As mentioned above, the graphic states for each data area are set forth in the PDL specification, and pertain to the print attributes that describe how particular graphic or alpha-numeric data is to appear on the printed page. Once the control task completes its processing of the PDL specification, the control task may save the template display list 25 in memory 26. If the PDL-file 14 does not include code for any static data, the control task may generate an empty template display list 25 or may decide not to create a template display list at all.

Next, a merge task 28, having access to the variable data records 17 from the merge file 16, is executed to apply the reserved graphics states 23 and associated font cache, to the variable data records 17, creating rendering commands for that variable data record as defined by the graphic states. The merge task 28 retrieves a copy 25' of the template display list 25 from the memory 26 and merges the variable data rendering commands with the template display list to create a merged display list 30. Finally, the controller 10 performs a rendering task 32 to render the merged display list 30 into a plurality of bitmap bands 34 for dispatching to at least one print engine 36.

A method for performing the above control task and merge task is described in U.S. patent application Ser. No. 08/373,582 filed Jan. 17, 1995 and entitled "Method of Utilizing Variable Data Fields with a Page Description Language," the disclosure of which is incorporated herein by reference. A method and a system architecture for performing the above merging, banding and dispatching operations are respectively described in U.S. Pat. No. 5,594,860 and U.S. patent application Ser. No. 08/558,007, filed Nov. 13, 1995, and entitled "System Architecture for Processing and Transporting a Pagemap or Bitmap Data to a Raster Print Engine," the disclosures of which are also incorporated herein by reference.

Figure 2:
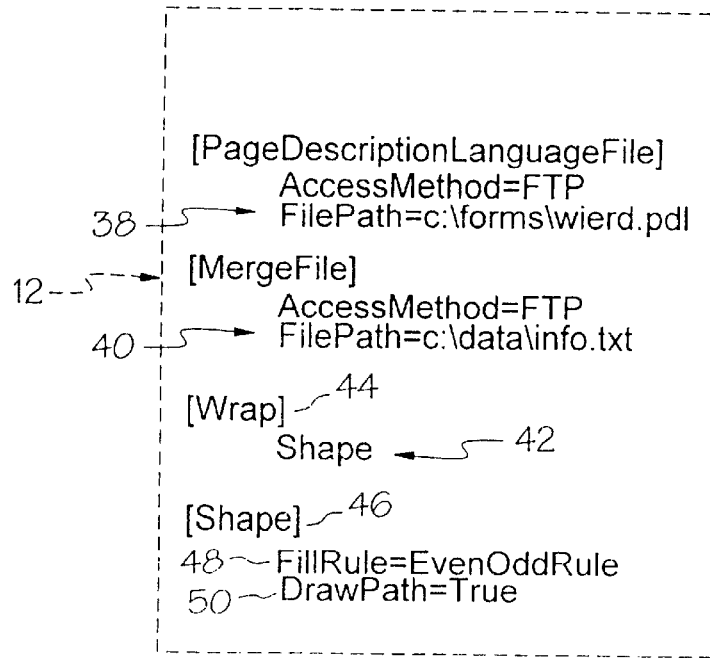
FIG. 2 is an example of a job ticket file for use with the present invention.

A preferred embodiment of the present invention is illustrated by way of example in FIGS. 2–10. As illustrated in FIG. 2, the job ticket file 12 can contain a file location statement 38 for determining the location and name of the PDL file, and can contain a file location statement 40 for determining the location and name of the merge file. The job ticket file 12 can also contain a descriptive name of a wrapping path 42, in this case, named "Shape," for identifying a name of a wrapping path in the PDL file that is to have variable data flowed into it during the merge task. The variable data to be flowed into the wrapping path, text data in this case, will be taken from the file designated by the file location statement 40 of the merge file. In this case the merge file is named "info.text." The group header 44 "[Wrap]" indicates that the group is defining a wrapping path. After the wrapping path "Shape" has been defined in the job ticket file, a second group header 46 "[Shape]" can be thereafter defined in the job ticket file to provide information about the wrap path; such as defining the fill rule 48 to be used in the wrapping operation, and such as defining a path drawing rule 50, i.e., whether the path is to be drawn in the final rendered image. Other definable wrapping commands for the particular path "Shape" can include defining the top, bottom or side margins, defining the justification, setting the number of paths to flow the data into, defining an overflow path, etc. A complete description of the different elements that can be defined for the wrapping path in the job ticket file is described in detail in the Appendix, below.

Figure 3:
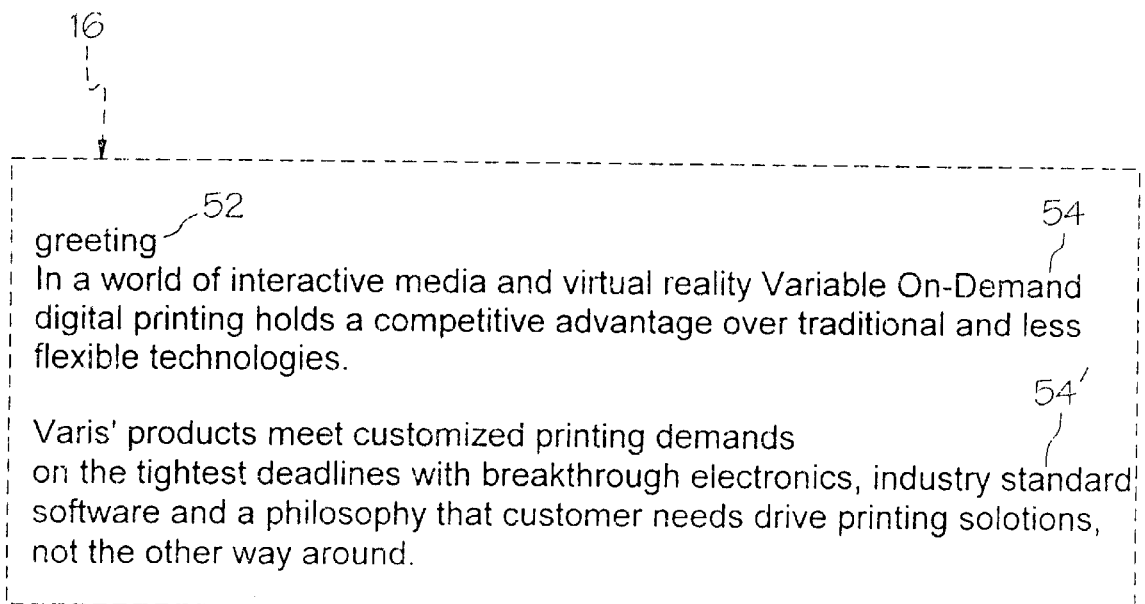
FIG. 3 is an example of a merge file for use with the present invention.

As illustrated in FIG. 3, the merge file 16 is a platform-independent data file that contains the "variable" data to be merged into the path defined in the PDL specification. The merge file can contain a field name 52, corresponding to a field name that will be defined in the PDL specification, which is associated with a particular variable data path. The merge file will also contain a number of variable data blocks 54, text blocks in this case, corresponding to the field name 52. One variable data block 54 will be merged into the variable data path, defined in the PDL specification, at a time.

Figure 4:
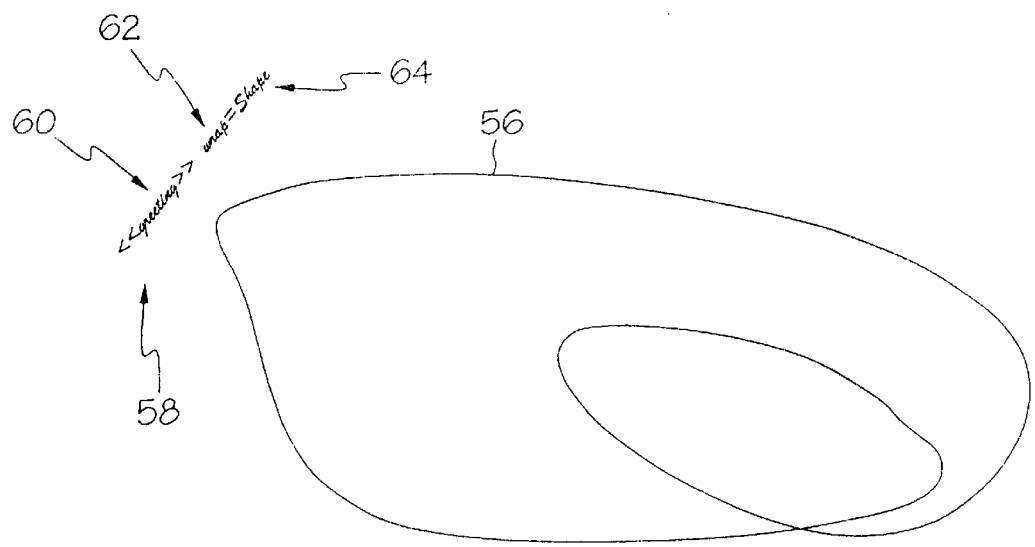
FIG. 4 is a graphical representation of data contained in a PDL specification for use with the present invention.

As illustrated in FIG. 4, the designer will utilize an application program to create a document containing a path 56 and attribute data, such as an attribute string 58, to be associated with the path 56. The application program will then be directed to create a PDL specification of the document by the designer. The attribute string 58 contains a field name 60 surrounded by special characters, "<<" and ">>", a wrap attribute command string 62, and a path identifier 63. The PDL specification generated by the application program will include the graphic states of the attribute string 58. These graphic states can include the font size (i.e., 10 point), the type-font (i.e., Script) the orientation (i.e., angled upwardly at 500) and the like.

As discussed above, and referring again to FIGS. 1–4, the control task 22 will execute a PDL interpreter program to interpret the PDL specification created by the application program to generate a template display list 25 of the document, and to also monitor for any variable data paths defined in the PDL specification.

In the preferred embodiment, the control task 22 monitors for variable data areas defined by the PDL specification by monitoring for special characters in the text strings defined by text commands in the PDL specification. As shown in FIG. 4, the special characters "<<" and ">>" surround the field name 60. The control task, upon identifying the special characters in the text command for the attribute string will thus know that the attribute string 58 is defining a variable data area, and is not merely defining a text string to appear on the printed page (the attribute string will not appear on the final printed page unless the control task is directed to by the job ticket file). The field name 60 surrounded by the special characters identifies the associated field name 52 present in the merge file 16. During the processing of the text command for the attribute string 58, the control task will also monitor for the wrap string 62 within the attribute string, which also includes the path identifier string 64 associated therewith. If found, the control task will know that a path defined in the PDL specification that has a predetermined relationship with the text command for the attribute string will be a wrapping path, where the wrapping path has the wrapping attributes defined in the job ticket file 12 for the particular group header 44 and descriptive name of a path 42 matching the path identifier string 63 set forth in the attribute string 58.

Preferably, the predetermined relationship is satisfied by the first path command to follow the text command for the attribute string in the PDL specification. This can be accomplished by using the application program to sequentially type the attribute string 58 and then draw the path 56, such that the path command will be the first path command to follow the text command in the PDL specification created by the application program. Alternatively the predetermined relationship can be satisfied by the path command that is "grouped" with the text command for the attribute string in the PDL specification. This can be accomplished by using a "GROUP" tool as provided by many application programs to group the attribute string 58 and path 56 together. It will be apparent to one of ordinary skill in the art that there are many similar predetermined relationships available between the text command for the attribute string and the path command for the wrapping path that can be established in the PDL specification, all of which fall within the scope of the present invention.

Thus, during the execution of the PDL interpreter program, the control task 22 will match the wrap attribute command string 62 and path identifier 64 with the group header 44 and descriptive name of the path 42 defined in the job ticket file 12. Once the attribute string 58 is identified as defining a variable data path by the control task 22, the control task will save the graphic states 23 of the attribute string 58 in memory. The control task may also create a font cache according to the graphic states 23, and store the font cache along with the graphic states in memory 24. The control task will also save the field name 60 along with the graphic states 23 in memory so that the particular graphic states can be matched to the blocks of text data in the merge file 16 under the matching field name 52, as will be described below. The merge task 28 will apply these graphic states 23 and associated font cache to the variable data 54 prior to merging and flowing the variable data into the path 56.

Once the control task 22 has identified the path as being a variable data path, and has reserved the graphic states 23 of the attribute string 58 associated with the path in memory 24, the control task 22 advances to the next data area in the PDL specification, preferably without allowing the attribute string data or the path to be added to the template display list 25 stored in memory 26. And once the PDL interpreter program has completed interpreting the PDL specification, the control task 22 then passes authority to the merge task 28.

The merge task 28 first accesses a set of the saved graphic states 23 and identifies the field name 60 associated with these graphic states. The merge task 28 then accesses the merge file 16 and searches the merge file for a field name 52 matching the field name 60 associated with the graphic states. The merge task then accesses a variable data block 54 associated with the field name 52 and then generates rendering commands for the variable data block according to the graphic states 23, the predefined flow rule 48 and the boundary of the path 56. The predefined flow rule 48, may or may not be defined by the job ticket file 12.

Accordingly, when the rendering command is executed the bit map data defined by the rendering command will flow within the path 56 according to a predefined flow rule.

Figure 5:
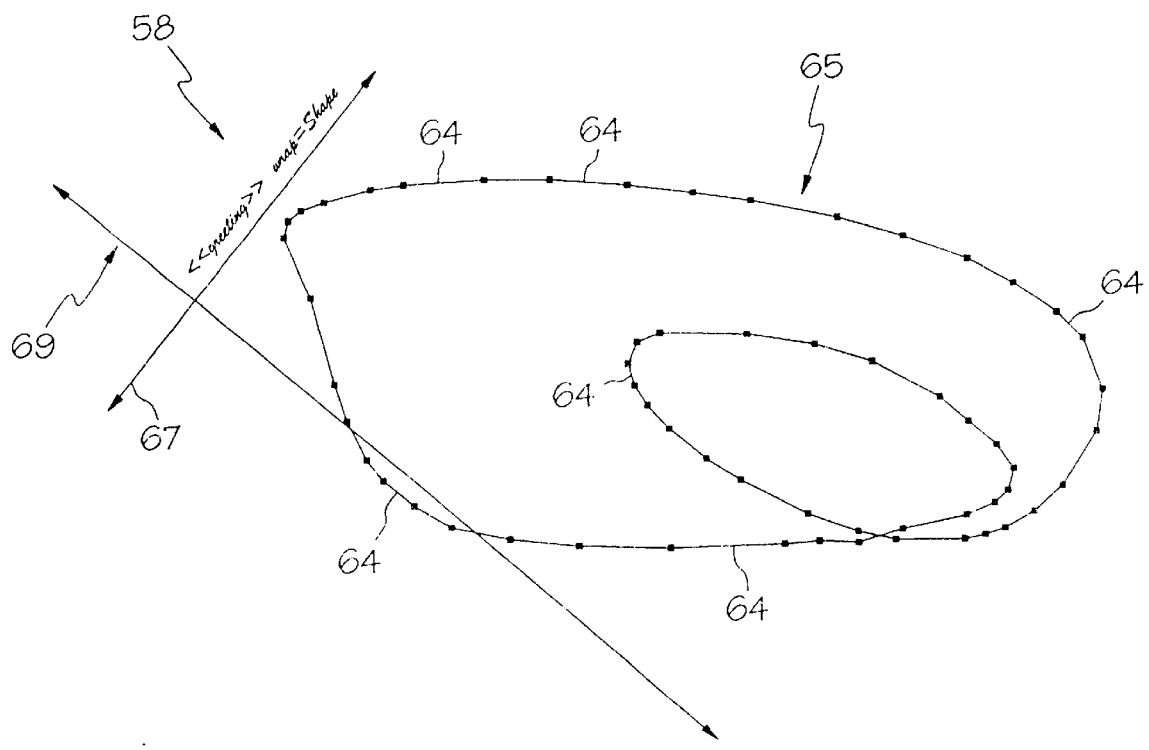
FIG. 5 is a graphical representation of a process step of the present invention operating on data contained in the PDL specification of FIG. 4.
Figure 6:
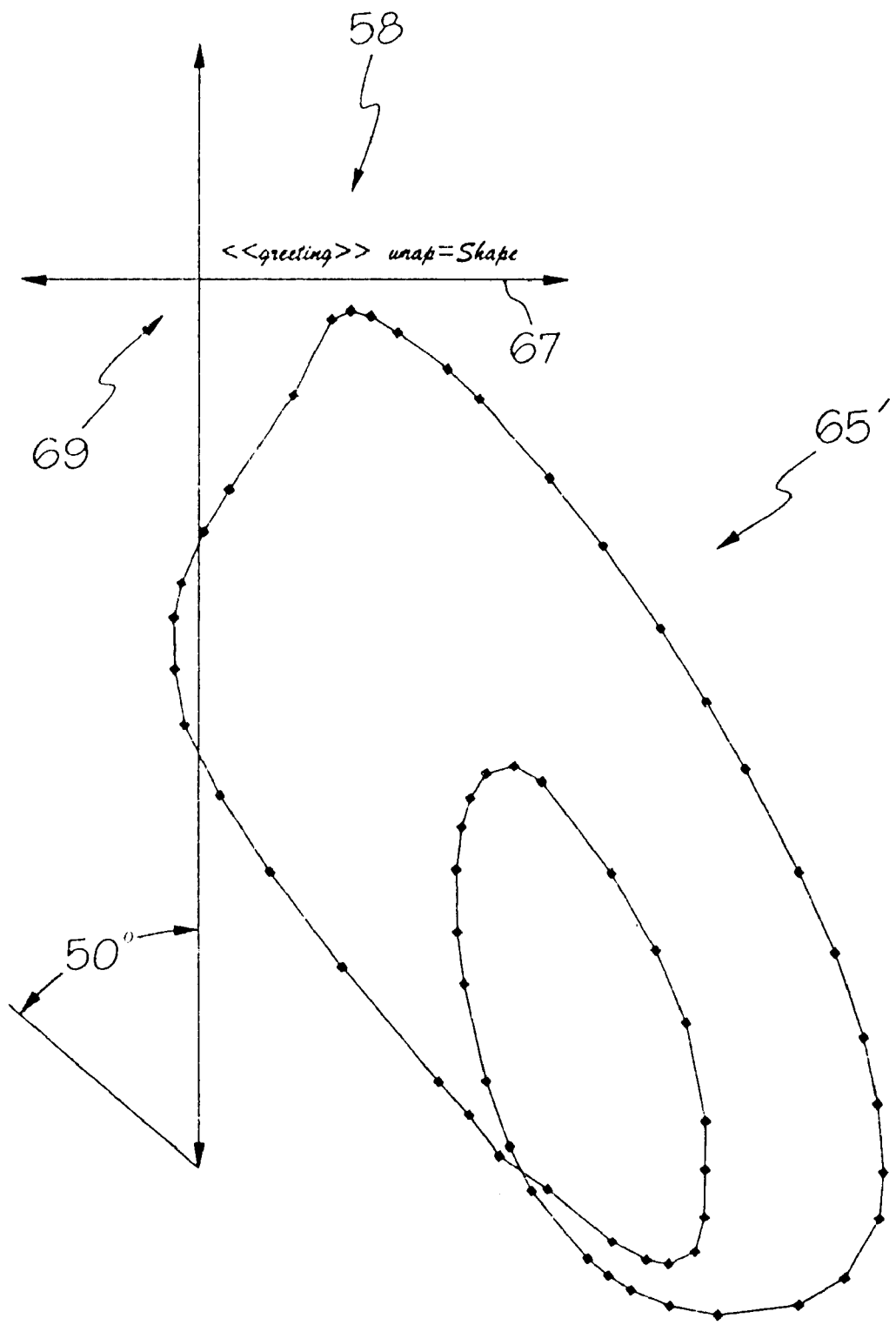
FIG. 6 is a graphical representation of a process step of the present invention following the process step of FIG. 5.
Figure 9:
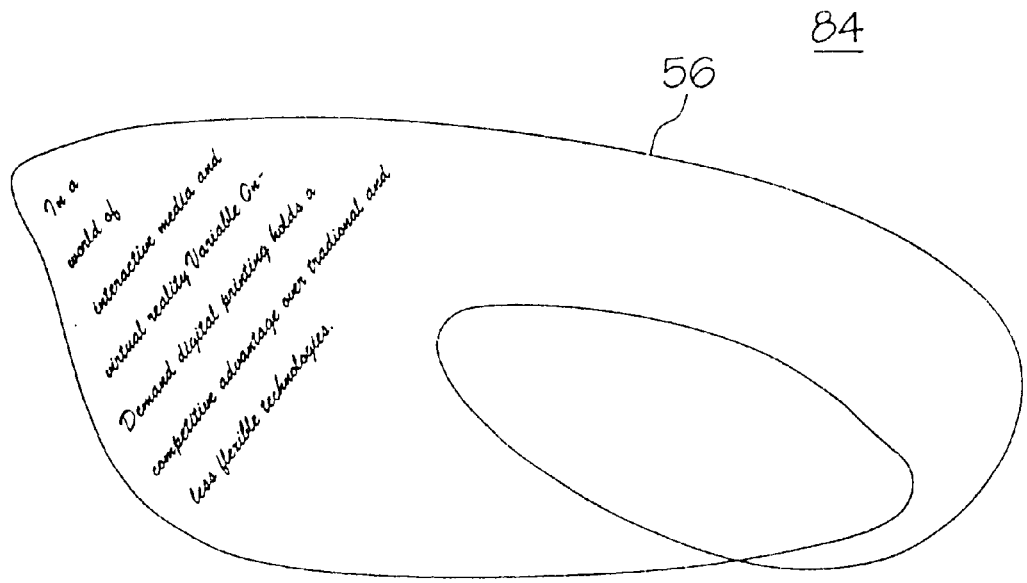
FIG. 9 is an example of a merged document created by the process and system of the present invention.
Figure 10:
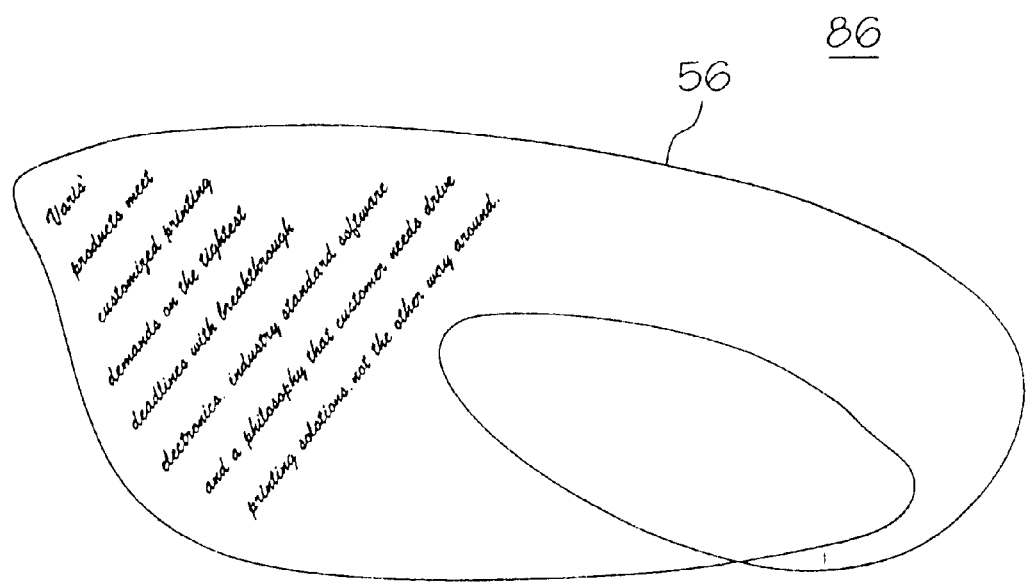
FIG. 10 is an example of a merged document created by the process and system of the present invention.
Figure 11:
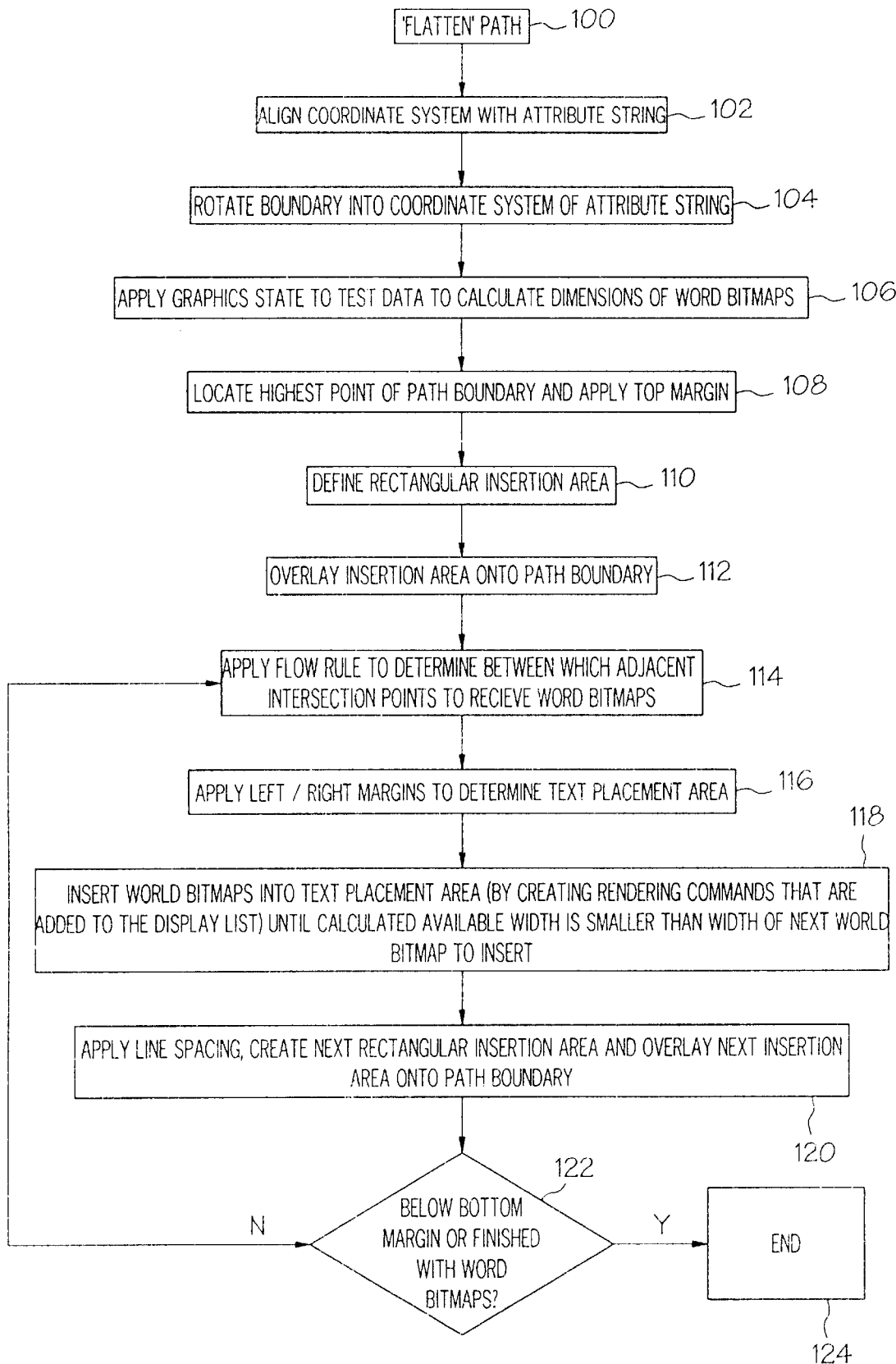
FIG. 11 is a flow chart representation of a process of the present invention.

As shown in FIG. 11, and as illustrated in FIGS. 5–10, a method for merging and flowing the variable text data into the path 56 is as follows: as indicated in step 100 and illustrated in FIG. 5, preferably the control task will first "flatten" the path, which involves breaking the complex path 56 (which may contain ellipses and curves) into a series of simple straight lines 64 (i.e., converting the path into a series of "move to" and "line to" commands). Each straight line 64 will comprise a particular portion of a boundary 65, into which the variable data is to be positioned. Alternatively, it is within the scope of the present invention to have the path 56 itself define the boundary into which the variable data is to be positioned. As will be described below, the extent of the boundary may also be defined, in part, by the designation of margins, or the creation of additional paths, etc. As indicated in step 102 and as also illustrated in FIG. 5, a horizontal axis 67 of a coordinate system 69 will be aligned with the attribute string 58. As indicated in step 104 and as illustrated in FIG. 6, a new equivalent boundary 65' is created, whose coordinates are those of the original boundary 65, but rotated into the same coordinate system 69 as the attribute string 58 (for example, as shown in FIG. 5, the attribute string 58 is rotated a negative 50° in the document, and therefore, in FIG. 6 the boundary 65' is rotated by a positive 50°).

Figure 7:
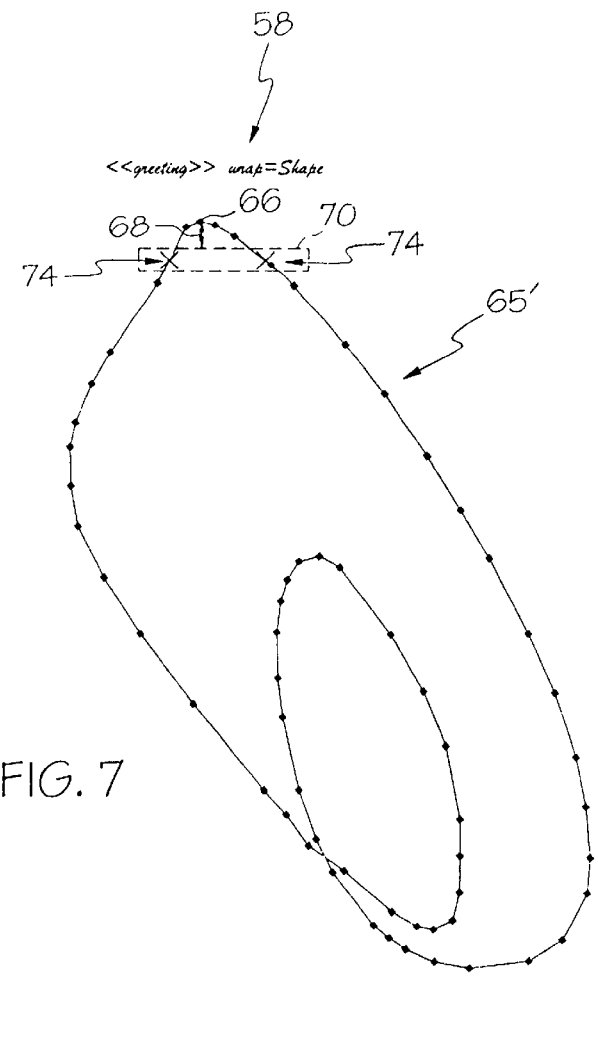
FIG. 7 is a graphical representation of a process step of the present invention following the process steps of FIGS. 5 and 6.
Figure 8:
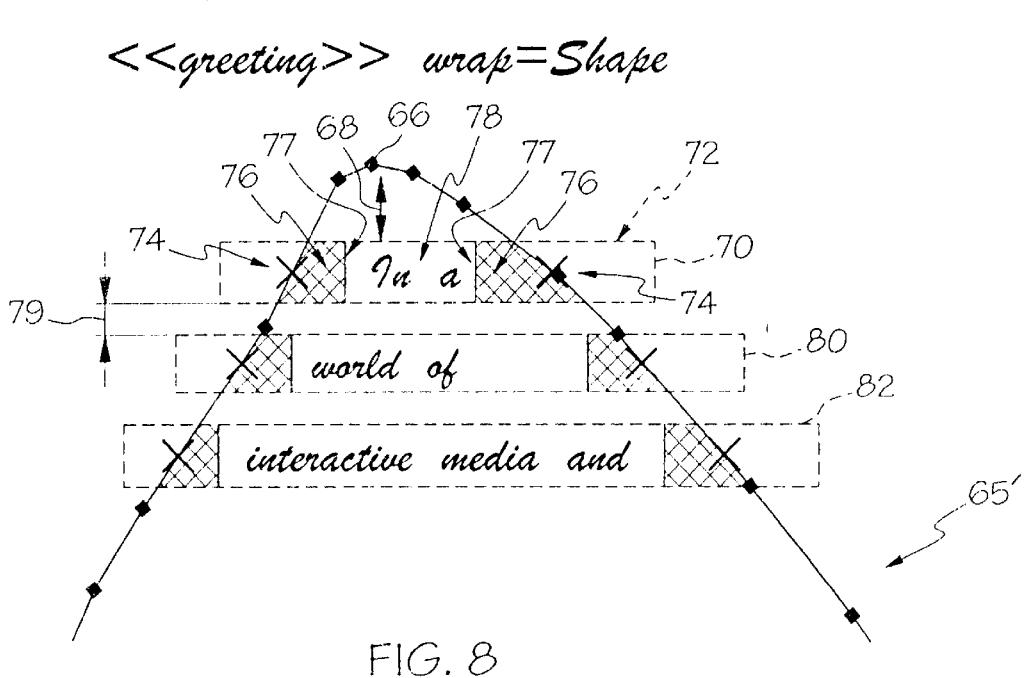
FIG. 8 is a graphical representation of a process step of the present invention following the process steps of FIGS. 5 and 6.

As indicated in step 106, the stored graphic states 23 (e.g., font-type and point size) are applied to a variable data block 54 to be merged into the boundary 65' so as to calculate the dimensions of a plurality of word bitmaps, the word bitmaps being defined by a collection of characters separated from the rest of the data by-white space characters (e.g., a space, tab, new line, etc.). The dimensions of paragraphs can be calculated by defining a paragraph as a collection of word bitmaps separated from other paragraphs by "new line" characters. Assuming that the text flow direction will be from top to bottom and left to right, as indicated in step 108 and as illustrated in FIGS. 7 and 8, the "top" or highest point 66 of the path 65' is determined and a top margin 68 is applied to the boundary 65' by measuring a distance downward from the highest point 66 of the boundary. The top margin 68 can be pre-defined, defined in the job ticket file 12, or by any other sufficient means.

As indicated in step 110 and illustrated in FIGS. 7 and 8, a rectangular insertion area 70 is defined, having a vertical height corresponding to the calculated vertical height of the bitmap representation of the first word (the point size of the text) to be flowed into the boundary 65', and having a top horizontal border 72 abutting the top margin 68. As indicated in step 112, this insertion area 70 will be overlaid onto the entire boundary 65' at that present vertical level to establish at least one intersection point 74. As indicated in step 114, only those areas between adjacent intersection points 74 will be considered valid candidates for receiving the bitmap representations of the text data. If there are more than two intersection points present within insertion area, then the particular flow rule being utilized will determine between which of the intersection points that the bitmap representations of the text data will be inserted. As illustrated in FIGS. 7 and 8, when only two intersection points are established, the bitmap representations of the text data will typically be inserted therebetween.

Once two adjacent intersection points 74 are determined to be candidates for receiving bitmap representations of the text data, as indicated in step 116 and illustrated in FIG. 8, left and right margins will then be measured inwardly from each of the intersection points 74 to define left and right borders 77 within the insertion area 70. Between the left and right borders 77, therefore, is defined a text placement area 78 for merging the bitmap representations of the text data therein. The left and right margins 76 can be pre-defined, defined in the job ticket file 12, or determined by any other sufficient means.

As indicated in step 118, the rendering commands to create the bitmap representations of a word of the text data as merged into the text placement area are created and added to the display list 25, depending upon whether the calculated width of the bitmap is equal to or less than the available width calculated to remain in the text placement area. The rendering commands will define the proper orientation of the bitmap representation of the word rotated back into the original orientation of the attribute string 58.

As illustrated in FIG. 8, in the first text placement area 78, bitmap representations of the words "in" and "a" were able to fit therewithin, however, the bitmap representation of the word "world" was too wide for the remaining width. Accordingly, in the final merged bitmap only the bitmaps representing the words "in" and "a" will be rendered into the first text placement area 78. If no word bitmaps are capable of fitting within the text placement area, then the area is left blank.

As indicated in step 120 and illustrated in FIG. 8, a line-spacing 79 is measured below the present insertion area and then the next rectangular insertion area 80 is created and overlaid onto the boundary 65' below the line-spacing 79 in the same manner as defined above for the first rectangular insertion area 70. As indicated in step 122, if the new insertion area extends below the lowest point of the boundary 651 (or below the bottom margin) or if there are no more words to insert, then the merging process for this particular boundary and text block is finished as shown in step 124. If the insertion area does not extend below the lowest point of the boundary and there are more bitmaps representing words to insert, then the process return ms to step 114, described above. Essentially, steps 114–122 will be repeated thereafter until step 124 is reached. As illustrated in FIG. 8, bitmaps representing the words "world" and "of" were able to be rendered into the second rectangular insertion area 80 and bitmaps representing the words "interactive," "media" and "and" were able to rendered into third rectangular insertion area 82.

Subsequent to step 122, the merge task will then search for additional variable data areas or variable data paths in which to merge variable data blocks. If no more of such variable data areas or variable data paths exist for the particular document, then the merged display list 30 is transferred to the rendering task 32, as described above, to generate the bitmap bands 34 for printing. FIG. 9 illustrates the entire block of text 54 from the merge file 16 formatted according to the above process and merged into the path 56 to create a first finished document 84. FIG. 10 illustrates the appearance of the next block of text 54' from the merge file 16 formatted according to the above process and merged into the path 56 to create a second finished document 86.

Preferably, in the above step 118, the height of the rectangular insertion area is determined by the dimensions calculated for the first word bitmap. And if, for whatever reason, a next word bitmap is calculated to be higher than the first or previous word bitmap, and higher than all other word bitmaps inserted thus far into a particular text placement area, then the entire rectangular insertion area is thrown out, and steps 116 and 118 are repeated again for the higher rectangular insertion area generated according to this higher word bitmap.

As discussed above, a number fill rules are available for flowing the word bitmaps into the boundary. Accordingly, the merge task can mark the path intersections 74 as "positive," "negative" or "neutral" based upon whether the path enters and leaves from the top or the bottom of the insertion area, or whether it enters and exits the insertion area from the same direction. All of the available fill rules will be apparent to one of ordinary skill in the art, and are thus within the scope of the present invention.

As discussed above, text flowing into the boundary 65' will continue until it is determined that there are no more word bitmaps to flow into the boundary or until it is determined that there is no more text areas available to flow the word bitmaps into. In the case of the latter, it is within the scope of the invention to define a path as an "overflow" path for continuing the flowing of the text therein, until this overflow path runs out of room. This overflowing process can continue until once again it is determined that there are no more text areas to flow text into. Text can also flowed into more than one path at a time.

Figure 12:
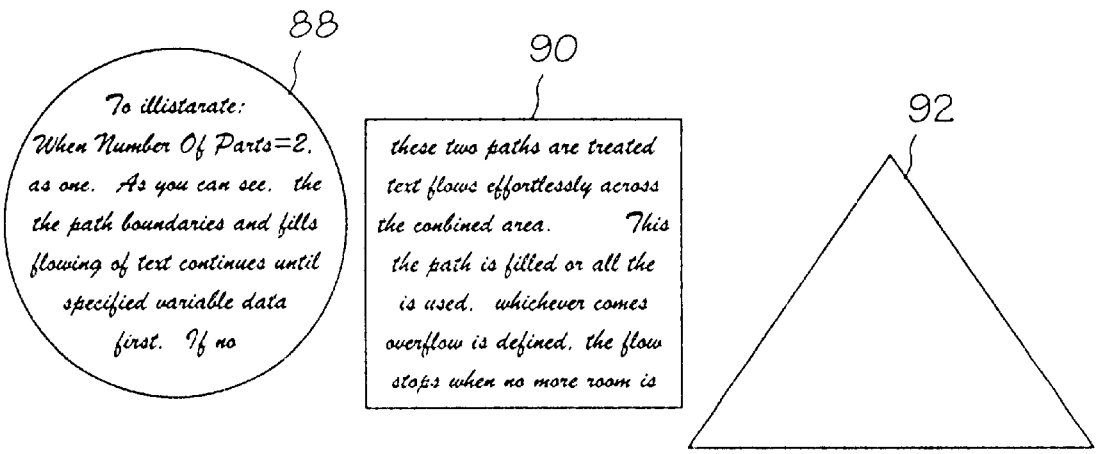
FIG. 12 is an example of a merged document created by the process and system of the present invention.
Figure 13:
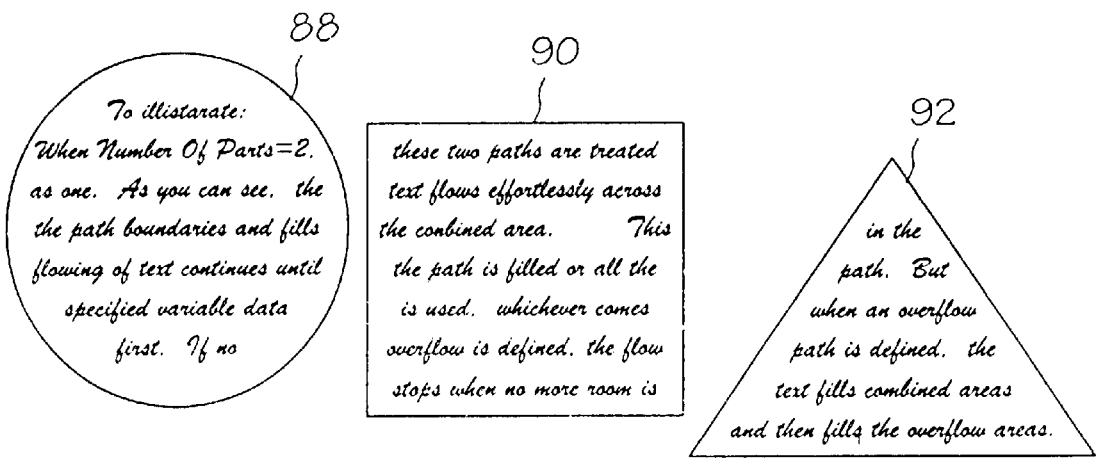
FIG. 13 is an example of a merged document created by the process and system of the present invention.

For illustration, as shown in FIG. 12, if the job ticket file defines the number of flow paths as two, and the two flow paths are the circle and square paths, designated as numerals 88 and 90, respectively; then the two paths essentially comprise one boundary, and text will flow directly from the circle path 88 into the square path 90. Note that the 2nd through 8th lines of text flow from the circle path 88 directly into the square path 90. But when the text reaches the end of the square path 90, the flowing operation stops because the area within the two flow paths have been used up. Accordingly, as illustrated in FIG. 13, if an "overflow path" is designated in the job ticket file to be the triangle path 92, the text flowing will continue into the triangle path 92 until there is no more text to be merged or until the path runs out of additional room.

Accordingly, the present invention provides capability of identifying particular paths defined in a page description language as data flowing paths, and provides the capability for flowing data within such paths. In addition, the present invention allows the user to specify margin, paragraph formatting, fill rules, and justification parameters on a path by path basis.

Having described the invention in detail and by reference to the drawings, it will be apparent to one of ordinary skill in the art that variations and modifications are possible without departing from the scope of the invention as defined on the following claims.

The following appendix provides a preferred compilation of text wrapping commands and parameter definitions that can be specified in the job ticket file 12. Each entry provides the particular command header, the syntax for the command, any relevant remarks for the use of the command, examples, etc. As will be apparent to one of ordinary skill in the art, it is within the scope of the present invention to include the means to provide for any of the attributes, or similar attributes, as defined in the Appendix.

APPENDIX

COMMAND HEADER=[Wrap]

A group that provides a list of tags which you create to describe the text flowing (wrap) path(s) to be used in the print job. Each tag will become a user-defined group of additional information about the wrap path.

Syntax [Wrap]

<Path Tag X>

<Path Tag Y>

<Path Tag Z>

Remarks Optional. Each tag that appears under this [Wrap] group will optionally become a new group name in a succeeding section of the Job Ticket.

Explanation <Path Tax X>

Create a descriptive name for a wrap path used in the print job.

Note: Fields on a template that you wish to be flowed into a particular path will use a field attribute of the format:

<<fieldname>> wrap=<name>

The <name> argument of the wrap attribute must match a path tag listed in the [Wrap] group.

| Example | [Wrap] |
|---|---|
| | Circle |
| | Square |
| | Triangle |
| COMMAND HEADER = [<Path Tag>] | |

A user-defined tag name for a group that provides information about the wrap path and corresponds to the descriptive tag that you create under the initial [Wrap] group.

| Syntax | [<Path Tag>]<br>Baseline Adjust =<br>Bottom Margin =<br>Clobber Path =<br>Draw Path =<br>Enforce paragraph Spacing =<br>Fill Rule =<br>Fit Last Name =<br>Justify =<br>Left Margin =<br>Margins =<br>Min Paragraph Lines =<br>Number Of Paths =<br>Overflow =<br>Paragraph Adjust =<br>Reverse Flow =<br>Reverse Path =<br>Right Margin =<br>Top Margin = |
|---|---|

Remarks

A separate [<Path>] group defines path information for each descriptive tag listed under the initial [Wrap] group.

If a [<Path Tag>] group is not defined for a path listed under the [Wrap] group, that path will receive the default values for all of the [<Path Tag>] elements.

Explanation [<Path Tag>]

Take the descriptive tag under the initial [Wrap] group and write it here as a group name within the brackets [ ].

Baseline Adjust=
 (See the Baseline Adjust element description)
Bottom Margin=
 (See the Bottom Margin element description)
Clobber Path=
 (See the Clobber Path element description)
Draw Path=
 (See the Draw Path element description)
Enforce Paragraph Spacing=
 (See the Enforce Paragraph Spacing element description)
Fill Rule=
 (See the Fill Rule element description)
Fit Last Line=
 (See the Fit Last Line element description)
Justify=
 (See the Justify element description)
Left Margin=
 (See the Left Margin element description)
Margins=
 (See the Margins element description)
MinParagraph Lines=
 (See the MinParagraph Lines element description)
Number Of Paths=
 (See the Number Of Paths element description)
Overflow=
 (See the Overflow element description)
Paragraph Adjust=
 (See the Paragraph Adjust element description)
Paragraph Indent=
 (See the Paragraph Indent element description)
Reverse Flow=
 (See the Reverse Flow element description)
Reverse Path=
 (See the Reverse Path element description)
Right Margin=
 (See the Right Margin element description)
Top Margin=
 (See the Top Margin element description)

| Examples | [Circle] | |
|---|---|---|
| | Fill Rule = | EvenOddRule |
| | DrawPath = | False |
| | Overflow = | Square |
| | [Square] | |
| | FillRule = | WindingRule |
| | DrawPath = | True |
| | Overflow = | Triangle |
| | [Triangle] | |
| | FillRule = | EvenOddRule |
| | DrawPath = | False |
| | Overflow = | Square |
| | [Square] | |
| | FillRule = | WindingRule |
| | DrawPath = | True |
| | Overflow = | Triangle |
| | [Triangle] | |
| | FillRule = | EvenOddRule |
| | DrawPath = | False |

PARAMETER Baseline Adjust

An element that determines the adjustments made to each baseline of text drawn within the path.

| Syntax | Baseline Adjust = <BaseAdjustNum><Unit Type> |
|---|---|
| See Also | Paragraph Adjust, Enforce Paragraph Spacing. |
| Remarks | Optional. |

By default, the process will space successive text lines at 120% of the font size. For example, a 12-point font will have the next baseline set at 14.4 points (120%×12) from the previous baseline.

The Baseline Adjust element defines an offset from this default value.

A positive Baseline Adjust value increases the space between each baseline of text (essentially, moving the next line of text down). A negative value decreases the space between each baseline of text (essentially, moving the next line of text up).

The default value for Baseline Adjust is 0.

Explanation <BaseAdjustNum>
 Enter the number of units.
<Unit Type>
 Optional. Enter the abbreviation to identify the unit type if the unit type for Baseline Adjust is different from the default unit type defined in the Units element. Possible values are:

| cm | for centimeters |
|---|---|
| dots | for dots |
| ft | for feet |
| in | for inch (default value) |
| mm | for millimeter |
| pts | for points |

Example BaselineAdjust=1 pt
PARAMETER=Bottom Margin
 An element that specifies the distance from the bottom of the path at which to stop flowing text.

| | |
|---|---|
| Syntax | BottomMargin = <Bottom Margin Num><Unit Type> |
| See Also | Margins, Overflow. |
| Remarks | Options. |

NOTE: A non-zero value for the BottomMargin element overrides (for the bottom margin only) the value set in the Margins elements.

For example, if Margins=1 in and BottomMargin=2 in, the path will have 0.1-inch margins on the top, left, and right sides but will have a 2-inch margin on the bottom side.

The default value for Bottom Margin is 0.
Explanation <BottomMarginNum>
  Enter the number of units.
  <UnitType>
  Optional. Enter the abbreviation to identify the unit type if the unit type for Bottom Margin is different from the default unit type defined in the Units element. Possible values are:

| | |
|---|---|
| cm | for centimeters |
| dots | for dots |
| ft | for feet |
| in | for inch (default value) |
| mm | for millimeter |
| pts | for points |

Example BottomMargin=3 mm
PARAMETER=Clobber Path

An element that specifies if two adjacent ON areas separated by a path segment are treated as one area when determining text flow.

| | |
|---|---|
| Syntax | ClobberPath = [True/False] |
| See Also | FillRule |
| Remarks | Optional |

This element affects the way in which text is flowed in adjacent ON areas. It applies only to paths defined with FillRule=WindingRule.

If ClobberPath is set to True, text is flowed across the two adjacent ON areas as if they were one area. In this case, only the "outer" margins of the combined areas would be recognized. Text flow would be continuous across the "inner" margins where the path segment intersects the adjacent areas.

If ClobberPath is set to False, text is flowed separately into each Area.

The default value of ClobberPath is True.
False.
Explanation {True/False}
  If two adjacent ON areas are to be treated as one area, type True.
  If two adjacent ON areas are to be maintained separately, type False.
Example ClobberPath=False
PARAMETER=DrawPath An element that determines if the wrap path is actually drawn on the template.

| | |
|---|---|
| Syntax | DrawPath = {True/False} |
| Remarks | Optional. |

The default value for DrawPath is True.
Explanation (True/False)
  If the wrap path is to be drawn on the template, type True.
  If the wrap path is NOT to be drawn on the template, type False.
Example DrawPath=False
PARAMETER=EnforceParagraphSpacing An element that determines if the next paragraph will always start at a distance of the ParagraphAdjust value from any previous paragraphs that were set.

| | |
|---|---|
| Syntax | EnforceParagraphSpacing = {True/False} |
| See Also | BaselineAdjust, ParagraphAdjust. |
| Remarks | Optional. |

If the text flowed into your path contains blank paragraphs, this element determines how the blank paragraphs are to be handled.

If you want your next paragraph to start at a distance of the ParagraphAdjust value from your previous text paragraph (thereby, "skipping" any blank paragraphs and permitting text to continue to flow), set the EnforceParagraphSpacing value to True.

If you want the blank paragraphs to be allotted the appropriate space defined in ParagraphAdjust, set the EnforceParagraphSpacing value to False.

The default value for EnforceParagraphSpacing is False.
Explanation {True/False}
  If the next non-blank paragraph should start at a distance of the ParagraphAdjust value from any previous paragraphs that were set, type True
  If blank paragraphs are to be allocated their appropriate paragraph space, type False.
Example EnforceParagraphSpacing=True
PARAMETER=FillRule An element that provides the rules used to determine which areas of the path should have text flowed into them and which areas should be blank.

| | |
|---|---|
| Syntax | FillRule = {WindingRule/EvenOddRule} |
| See Also | Clobberpath, Reversepath. |
| Remarks | Optional. |

Text is flowed into an area enclosed by ("inside") the current path. If a path is simple, it is clear which areas are inside the path. However, if a path is complex (for example, intersecting itself or having one subpath that encloses another), it is not as apparent which areas are inside. One of two fill rules will be used to determine which areas lie inside a path.

The FillRule element defines if the non-zero winding rule (WindingRule) or the even-odd rule (EvenOddRule) will be used for the current path.

The non-zero winding rule determines whether a given area along the proposed flow line is inside the path (and thus receives text) by examining the places where a path segment crosses the flow line. Path segments that cross (intersect) the flow line from top to bottom are given a direction of 1. Path segments that cross (intersect) the flow line from bottom to top are given a direction of −1. Path segments that do not fully cross the flow line (for example, entering and exiting the top of the flow line) are given a direction of zero.

An on-going sum of all crossings is calculated from left to right. If the sum of all crossings to that point is zero, the area (immediately to the right) is outside the path. If the sum is non-zero, the area is inside the path and will receive text.

The even-odd rule determines whether a given area long the proposed flow line is inside the path (and thus receives text) by counting the number of times a path segment crosses the flow line. Path segments that fully cross (intersect) the flow line are given a score of 1. Path segments that do not fully cross the flow line are given a score of zero.

An on-going sum of all crossings is calculated from left to right. If the sum of all crossings to that point is even, the area (immediately to the right) is outside the path. If the sum is odd, the area is inside the path and will receive text.

The default value for FillRule is WindingRule.
Explanation {Winding Rule/EvenOddRule}

If the winding rule will determine which areas lie inside a path, type WindingRule.

If the even-odd rule will determine which areas lie inside a path, type EvenOddRule.
Example FillRule=EvenOddRule
PARAMETER=FitLastLine An element that determines if the Fit justification rule is applied to the last line of every paragraph.

| Syntax | FitLastLine = {True/False} |
|---|---|
| See Also | Justify |
| Remarks | Optional. |

The FitLastLine element applies only to paths defined with Justify=Fit.

If FitLastLine is set to True, the text on the last line will be forced to fit flush on the left and the right. Since the last line of a paragraph may often contain less text than the other lines in a paragraph, this justification will often result in more white space between text on the last line.

The default value for FitLastLine is False.
Explanation (True/False)

If the last line of every paragraph should be aligned at both the left side and the right side of the path, type True.

If the last line of every paragraph should not be forced to fit flush left and flush right, type False.
Example FitLastLine=False
PARAMETER=Justify An element that specifies the type of justification (horizontal alignment) to be applied to each line of text drawn in the path.

| Syntax | Justify = <JustifyRule> |
|---|---|
| See Also | FitLastLine |
| Remarks | Optional. |

The default value for Justify is Left.
Explanation <JustifyRule>

Enter the type of justification (horizontal alignment) to be applied to each line of text drawn in the path. Possible values are:

Left (Default value) Text is aligned from the left side of the path.

Right Text is aligned from the right side of the path.

Center Text is centered between the left side and right side of the path.

Fit Text is aligned at both the left side and right side of the path.
Example Justify=Center
PARAMETER=LeftMargin An element that specifies the distance from the left side of the path at which to start flowing text.

| Syntax | LeftMargin = <LeftMarginNum><UnitType> |
|---|---|
| See Also | Margins |
| Remarks | Optional. |

NOTE: A non-zero value for the LeftMargin element overrides (for the left margin only) the value set in the Margins elements.

For example, if Margins=1 in and LeftMargin=2 in, the path will have 1-inch margins on the bottom, top, and right sides but will have a 2-inch margin on the left side.

A default value for LeftMargin is 0.
Explanation <LeftMarginNum>

Enter the number of units.
<UnitType>

Optional. Enter the abbreviation to identify the unit type if the unit type for LeftMargin is different from the default unit type defined in the Units element. Possible values are:

| cm | for centimeters |
|---|---|
| dots | for dots |
| ft | for feet |
| in | for inch (default value) |
| mm | for millimeters |
| pts | for points |

Example LeftMargin=5 mm
PARAMETER=Margins

An element that specifies the same text margins for all four sides of the path (top, bottom, left, and right).

| Syntax | Margins = <MarginsNum><Unit Type> |
|---|---|
| See Also | BottomMargin, LeftMargin, Right Margin, TopMargin |
| Remarks | Optional. |

Note: The value for the Margins element will be overridden on an individual margin basis by any non-zero value defined for the other specific margin attributes (BottomMargin, LeftMargin, RightMargin, and TopMargin).

For example, if Margins=1 in and TopMargin=2 in, the path will have 1-inch margins on the bottom, left, and right sides but will have a 2-inch margin on the top.

The default value for Margins is 0.
Explanation <MarginsNum>

Enter the number of units.
<UnitType>

Optional. Enter the abbreviation to identify the unit type if the unit type for Margins is different from the default unit type defined in the Units eelement. Possible values are:

| cm | for centimeters |
|---|---|
| dots | for dots |

| | |
|---|---|
| ft | for feet |
| in | for inch (default value) |
| mm | for millimeter |
| pts | for points |

Example Margins=6 mm
PARAMETER=MinParagraphLines

An element that specifies the minimum number of lines of a paragraph to be set before the paragraph is allowed to be split between path areas.

| | |
|---|---|
| Syntax | MinParagraphLines = <MinLinesNum> |
| See Also | NumberOfPaths, Overflow. |
| Remarks | Optional. |

If the minimum number of lines of a paragraph defined here cannot be set consecutively in a path area, the entire paragraph will be moved down to the next scanline that allows the specified number of lines to be set consecutively.

The default value for MinParagraphLines is 1.
Explanation <MinLinesNum>

Enter the integer representing the minimum number of lines of a paragraph to be set before splitting between path areas is permitted.
Example Min Paragraph Lines=2
PARAMETER=NumberOfPaths An element that determines how many postscript paths on the template are concatenated and treated as one path.

| | |
|---|---|
| Syntax | NumberOfPaths = <PathsNum> |
| See Also | MinParagraphLines, Overflow. |
| Remarks | Optional. |

This element is used to combine multiple paths drawn on the template, and to treat them as a single path. The path to be combined will be determined—by the order in which they were drawn.

The default value for NumberOfPaths is 1.
Explanation <PathsNum>
Enter the integer representing the number of paths to be combined.
Example NumberOfPaths=2
Illustration See FIG. 12 and corresponding description above.
PARAMETER=Overflow An element that specifies the name (tag) of the wrap path that will receive overflow text from the current wrap path being described.

| | |
|---|---|
| Syntax | Overflow = <PathTag> |
| See Also | MinParagraph Lines, NumberOfPaths. |
| Remarks | Optional. |

This element defines the use of an overflow feature. When overflow is available, if the current path has no more space into which text can flow, the text will continue to flow into the path named in this element.

NOTE: If the Overflow element references a wrap path that is not named under the [Wrap] group, the print job will be aborted.

If the Overflow element is not defined, the system will assume that no overflow will occur for the current path being described. Therefore, text will flow into the current path until it is filled. No overflow text will be printed.
Explanation <PathTag>

Enter the descriptive tag of the path into which overflow text from the current path will flow. This value should correspond to a descriptive tag that you created under the initial [Wrap] group.
Example Overflow=Square
Illustration See FIG. 13 and the corresponding description above.
PARAMETER=ParagraphAdjust An element that determines the distance to adjust the baseline for the start of the next paragraph within the path.

| | |
|---|---|
| Syntax | ParagraphAdjust = <ParagraphadjustNum><Unit Type> |
| See Also | BaselineAdjust, Enforce Paragraph Spacing |
| Remarks | Optional. |

The ParagraphAdjust value overrides the Baseline Adjust value only for the first baseline of text in each paragraph.

A position ParagraphAdjust value increases the vertical space between the last baseline of text in each paragraph and the start of the next paragraph (essentially, moving the start of the next paragraph down). A negative value decreases the vertical space between the last baseline of text in each paragraph and the start of the next paragraph (essentially, moving the start of the next paragraph up).

The default value for ParagraphAdjust is 0.
Explanation <ParagraphadjustNum>

Enter the number of units.
<UnitType>

Optional. Enter the abbreviation to identify the unit type if the unit type for ParagraphAdjust is different from the default unit type defined in the Units element. Possible values are:

| | |
|---|---|
| cm | for centimeters |
| dots | for dots |
| ft | for feet |
| in | for inch (default value) |
| mm | for millimeter |
| pts | for points |

Example ParagraphAdjust=6 pts
PARAMETER=ParagraphIndent

An element that specifies the indentation from the left margin for the first line of every paragraph in the path.

| | |
|---|---|
| Syntax | ParagraphIndent = <ParagraphIndentNum><UnitType> |
| See Also | ParagraphAdjust |
| Remarks | Optional. |

The default value for ParagraphIndent is 0.
Explanation <ParagraphIndentNum>

Enter the number of units.
<UnitType>

Optional. Enter the abbreviation to identify the unit type if the unit type for ParagraphIndent is different from the default unit type defined in the Units element. Possible values are:

| | |
|---|---|
| cm | for centimeters |
| dots | for dots |
| ft | for feet |
| in | for inch (default value) |
| mm | for millimeter |
| pts | for points |

Example ParagraphIndent 0.5 in
PARAMETER ReverseFlow
An element that determines if the text will be flowed from bottom to top in the current path.

| | |
|---|---|
| Syntax | ReverseFlow = (True/False) |
| See Also | FillRule |
| Remarks | Optional. |

The default value for ReverseFlow is False.
Explanation {True/False}
  If the text will be flowed from bottom to top, type True.
  If the text will be flowed from top to bottom, type False.
Example ReverseFlow=True
PARAMETER=ReversePath
An element that determines if the ON/OFF designations for areas in the path will be reversed.

| | |
|---|---|
| Syntax | ReversePath = {True/False} |
| See Also | FillRule |
| Remarks | Optional. |

The ReversePath element applies only to paths defined with FillRule=EvenOddRule.
  If ReversePath is set for True, the areas originally marked as ON based on the EvenOddRule calculation will be set to OFF and the areas originally marked as OFF based on the EvenOddRule calculation will be set to ON.
  If ReversePath is set to False, the EvenOddRule calculations will be retained.
  The default value for ReversePath is False.
Explanation (True/False)
  If the ON/OFF designations for areas in the path will be reversed, type True.
  If the ON/OFF designations for areas in the path will be retained, type False.
Example ReversePath=True
PARAMETER=RightMargin
An element that specifies the distance from the side of the path at which to stop flowing test.

| | |
|---|---|
| Syntax | RightMargin = <RightMarginNum><UnitType> |
| See Also | Margins |
| Remarks | Optional. |

NOTE: A non-zero value for the RightMargin element overrides (for the right margin only) the value set in the Margins element.
For example, if Margins=1 in and RightMargin=2 in, the path will have 1-inch margins on the bottom, top, and left sides but will have a 2-inch margin on the right side.
  The default value for RightMargin is 0.
Explanation <RightMarginNum>
  Enter the number of units.
<UnitType>
  Optional. Enter the abbreviation to identify the unit type if the unit type for RightMargin is different from the default unit type defined in the Units element. Possible values are:

| | |
|---|---|
| cm | for centimeters |
| dots | for dots |
| ft | for feet |
| in | for inch (default value) |
| mm | for millimeter |
| pts | for points |

Example RightMargin 5 mm
PARAMETER=TopMargin
An element that specifies the distance from the top of the path at which to start flowing text.

| | |
|---|---|
| Syntax | TopMargin = <TopMarginNum><UnitType> |
| See Also | Margins |
| Remarks | Optional. |

NOTE: A non-zero value for the TopMargin element overrides (for the top margin only) the value set in the Margins element.
For example, if Margins=1 in and TopMargin=2 in, the path will have 1-inch margins on the bottom, left, and right sides but will have a 2-inch margin on the top side.
  The default value for TopMargin is 0.
Explanation <TopMarginNum>
  Enter the number of units.
<UnitType>
  Optional. Enter the abbreviation to identify the unit type if the unit type for TopMargin is different from the default unit type defined in the Units element. Possible values are:

| | |
|---|---|
| cm | for centimeters |
| dots | for dots |
| ft | for feet |
| in | for inch (default value) |
| mm | for millimeter |
| pts | for points |

Example TopMargin=,25 in

What is claimed is:

1. A computer implemented method for flowing data to an arbitrary path defined by a page description language specification, comprising the steps of:
  interpreting a page description language specification defining a template document;
  during the interpreting step, identifying a path defined by the page description language specification as a data wrapping path, the data wrapping path having a boundary;
  associating a data block, separate from the page description language specification, with the data-wrapping path;
  generating a bitmap representation of the data block according to the path boundary and according to a pre-defined flow rule; and
  merging the bitmap representation of the data block with a bitmap representation of the template document.

* * * * *

UNITED STATES PATENT AND TRADEMARK OFFICE
CERTIFICATE OF CORRECTION

PATENT NO. : 6,487,568 B1 Page 1 of 1
DATED : November 26, 2002
INVENTOR(S) : Forrest P. Gauthier and James R. Walker It is certified that error appears in the above-identified patent and that said Letters Patent is hereby corrected as shown below:

<u>Title page,</u>
Item [56], References Cited, U.S. PATENT DOCUMENTS, the spelling of inventor name "Anderson" should be corrected to -- Andresen --;

<u>Column 1,</u>
Lines 54 and 57, between the words "to" and "printed" insert the word -- be -- to read -- to be printed --;

<u>Column 2,</u>
Line 42, between the words "the" and "commands", the initials "PIDL" should be -- PDL -- to read -- the PDL commands --;

<u>Column 3,</u>
Line 9, between the words "bitmap" and "may", delete the word "that" to read -- bitmap may --;

<u>Column 16,</u>
Line 62, the symbol "~" should be inserted between the first and second "e" in the word "eelement" to read -- e~element --.

Signed and Sealed this

Fifteenth Day of July, 2003

JAMES E. ROGAN
*Director of the United States Patent and Trademark Office*